United States Patent Office 3,490,487
Patented Jan. 20, 1970

3,490,487
DEMAND PRESSURE-REDUCING VALVE, IN WHICH THE DIAPHRAGM TILTS THE VALVE HEAD
Raymond Deloire, Vaucresson, France, assignor to La Spirotechnique, Paris, France
Filed Apr. 7, 1965, Ser. No. 446,289
Claims priority, application France, Apr. 29, 1964, 972,825, Patent 1,402,101
Int. Cl. A62b 7/04; F16k 31/12; B63c 11/02
U.S. Cl. 137—494                    12 Claims

ABSTRACT OF THE DISCLOSURE

Pressure regulator for breathing device in which the valve head is tilted by the diaphragm through a movable member. The valve head is downstream its seat. The valve head support constitutes, with the movable member, a cylinder-and-piston system the cavity of which is connected with the chamber surrounded by the valve seat. A mechanical connection of the valve seat with the movable member lets the latter angularly move but prevents it from separating from the valve seat in the absence of angular movement.

---

This invention relates to a demand pressure-reducing valve, as for a breathing apparatus for example, in which the movement of the diaphragm displaces a movable member which tilts the valve head in its seat.

Figure 1:
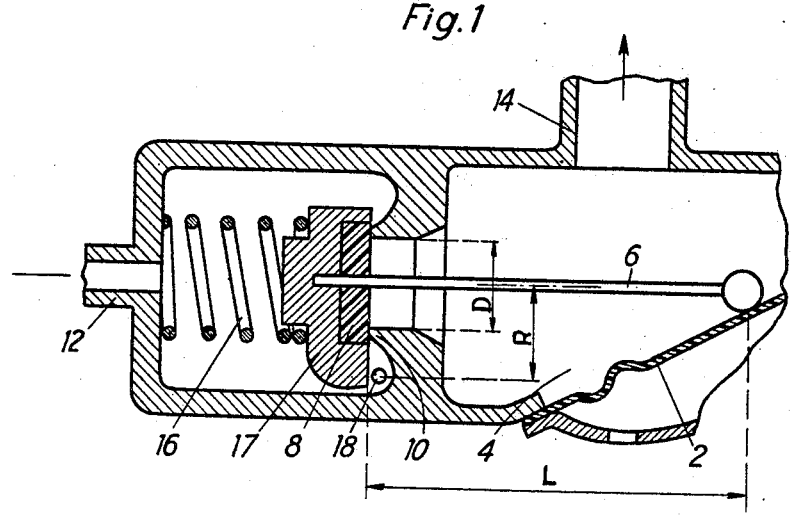

The attached FIGURE 1 diagrammatically represents partially in section a pressure-reducing valve of this known type: the diaphragm 2 which closes an expansion chamber 4 acts on a movable member 6 when an under pressure occurs in this chamber. The member 6 then tilts a valve head 8 about the lower part of the valve seat 10; this permits compressed gas arriving by means of a tube 12 to pass between the valve and its seat and to enter with expansion, into the chamber 4, which it leaves by means of another tube 14. A weak spring 16 ensures the closing of the valve when the upstream pressure of the gas is relatively low.

The valve head 8 and its support 17 are positioned upstream of the valve-seat 10 so that the sealing of the valve head is assured by the pressure upstream and not by a spring: otherwise the force of this spring should exceed the maximum effect of the pressure upstream of the valve head, and would severely hinder the movement of the valve head when it is largely balanced by the upstream pressure.

When the dimensions of such a reducing valve must be kept within reasonable limits, it is necessary to give the effective diameter D of the valve head a fairly small value, which limits the outflow of the reducing valve when the upstream pressure is not very high.

Let L be the effective length of the member 6, and D the effective diameter of the valve head; the force required to tilt the valve head about a point on its seat is equal to the lateral component of the force applied by the diaphragm on the extremity of the member 6, multiplied by $$L : \frac{D}{2}$$

Since the length L and the diameter of the diaphragm may not be increased at will since there is a limit imposed by the admissible dimensions of the pressure-reducing valve D may not be increased if a certain value for the pressure drop in the chamber 4 is not to be exceeded.

Because of this same question of dimensions, as well as for that of the flexion of the diaphragm, it is not possible to allow large values of the angular displacements of the member 6 and the valve head 8.

It has been proposed to follow this angular displacement by the raising of the whole of the valve head, fitting the reducing valve with a stop 18 placed at a distance R from the centre of the valve head R being appreciably greater than D/2. The valve head lifts then more when the valve support contacts this stop, but the multiplication of the force applied by the diaphragm is then only $L:R$; the under-pressure in the chamber 4 must then increase considerably in order for the valve support to continue to move when it has touched the stop 18. This results in difficulty in breathing and in an irregularity in the air supply.

The broad object of the invention is to provide a demand pressure-reducing valve in which a large output of gas is delivered when the controlling underpressure is small.

Another object of the invention is to provide a demand pressure-reducing valve of small size and large output.

More specifically, it is an object of the invention to provide a demand-pressure reducing valve, as for a breathing apparatus for example, of the above type in which the movement of the diaphragm displaces a movable member which tilts the valve head in its seat, wherein the valve head is positioned downstream of its seat, and therefore has the tendency to be displaced from its seat by the pressure of the gas to be expanded, wherein the valve support constitutes with the aforesaid movable member a cylinder and piston system in which the space between the cylinder and piston is joined to the space surrounded by the valve seat, the effective surface area of the said piston of said system being substantially equal to that defined by the bearing line of the valve head on its seat, and wherein the said movable member is mechanically connected to the valve seat, or to a component integral with said valve seat, by means of a component that allows the movable member an angular displacement with respect to the seat but which prevents separation from this latter in the absence of this angular displacement.

The valve head, being placed downstream of its seat, has the tendency to separate itself from the seat by the pressure of the gas upstream, as has been noted. But, in the case of the pressure-reducing valve according to the invention, this tendency is counterbalanced by the action of the cylinder and piston system in which the upstream pressure acts. A relatively weak spring is then sufficient to ensure the closing and sealing of the valve head and the force required to tilt the valve head is small. In this case a relatively low multiplication ratio may be accepted, corresponding to $$L : \frac{D}{2}$$

as above, and therefore relatively high values are possible for the effective diameter of the valve head.

Other and more detailed objects of the invention will become apparent from the following more particular description of preferred embodiments of the invention, as illustrated in the accompanying drawing.

Figure 2:
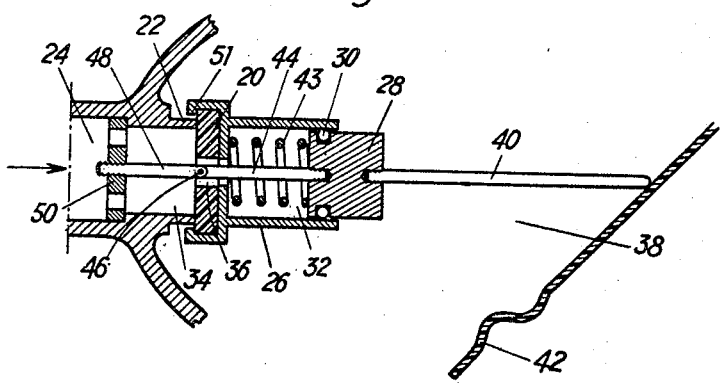
Figure 3:
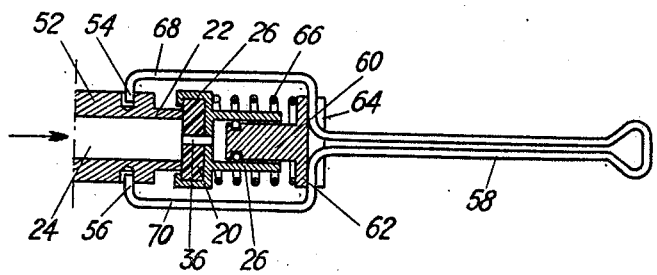
Figure 4:
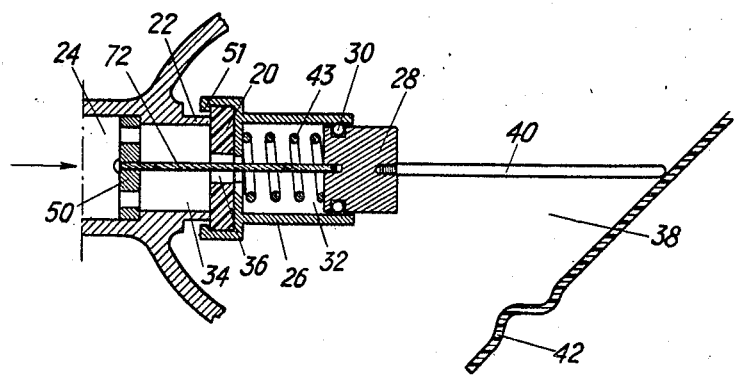
Figure 5:
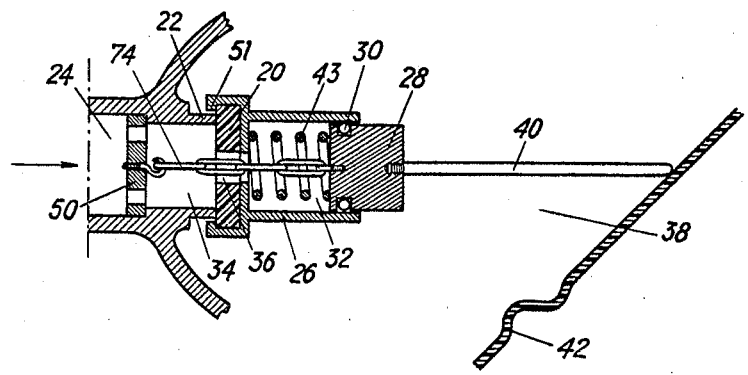

In the drawings:
FIG. 1 is a fragmentary sectional view of a pressure-reducing valve of a known prior art model.
FIG. 2 is a fragmentary sectional view of an embodiment of the invention.
FIG. 3 is a fragmentary sectional view of a modification of the embodiment of FIG. 2.
FIG. 4 represents a variant of FIG. 2 in which rods 44 and 48 are changed to a metal wire cable 72.
FIG. 5 represents a variant of FIG. 2 in which rods 44 and 48 are changed to a chain 74.

In these figures those components that have the same functions and whose construction is very similar, have the same reference numbers.

In FIGURE 2 the valve head 20 closes the valve seat 22 which terminates the passage 24 by which the gas to be expanded arrives, as for example a breathing mixture at medium pressure from a high-pressure reducing valve.

The valve head 20 is supported in a cylindrical valve support 26 in which a piston 28 may move without leakage owing to the packing 30; the cylindrical valve support carries a piston 28, forming a movable member with cylinder 26. The chamber or space 32 within this cylindrical valve support and this piston is connected by an orifice 36 in the valve head with the chamber or space 34 that is surrounded and defined by the valve seat 22.

The packing 30 prevents the gas in the space 32 from passing into the expansion chamber 38 that surrounds the valve support and the piston. The area of the surface defined by the line of contact between the packing 30 and the inner wall of the cylindrical valve support 26 is equal to the area of the surface defined by the line of contact of the valve head and the valve seat. From this results the fact that forces exerted on opposite surfaces of the valve on one hand and on the part of the valve support in contact with the space 32 on the other hand, are substantially equal; they act in opposite directions which means that the action of the gas is substantially zero. Into one side of the piston 28 a rod 40 is screwed which, together with the piston, constitutes what has been referred to above as the "movable member." On the distal end of this rod acts a diaphragm 42 which, as may be seen, forms one face of the expansion chamber 38. In the usual way this diaphragm is exposed on one face to the ambient pressure, and on the other face to the pressure in the chamber 38; the gas that is released through the valve head 20 passes into this chamber and leaves it to go to the wearer's mouthpiece.

A fairly weak spring 43 pushes the piston 28 away from the bottom of the valve support.

Another rod 44 is screwed into the other end of the piston 28. It is joined by a spindle 46 to a rod 48, itself screwed into a ring 50 bearing on a shoulder of the pipe 24. The piston 28 is thus prevented by the components 44, 46, 48 and 50, as well as the shoulder of pipe 24, from moving away from the valve head and the valve seat by the action of the spring 43 and the pressure of the gas in the space 32. The link 46, however, allows the piston and the rod 40 to incline themselves under the thrust of the diaphragm towards the top of FIGURE 2 and to return to the position indicated; this movement tilts the valve head 20 about that part of its seat 22 that is at the top of the figure, and allows or prevents the passage of the gas which must be reduced in pressure.

The flange 51 of the valve support centres the valve head 20 with respect to the seat 22. The play between the surfaces of the components 22 and 51 is small, and smaller than that represented, in order to ensure this centering, but it must permit a small measure of tilting. This centering may be further facilitated by bulging the valve head instead of giving its face nearer the pipe 24 a flat surface as indicated.

The pressure-reducing valve in FIGURE 2, as well as that in FIGURE 3, does not require a safety valve. It so happens that the pressure-reducing valve upstream leaks a little at high pressure; when a usual pressure-reducing valve, with its valve head upstream of its seat, is thus supplied with gas, it is necessary to provide it with a safety-valve to avoid too great a pressure increases resulting upstream of the valve head as a consequence of this leak, when it is not being used so that the valve head does not move. In the cases illustrated in FIGURES 2 and 3 the increase in pressure upstream of the valve head distorts the latter a little and displaces away from its axis the line that limits, on the side of this axis, the surface of contact of the valve head with its seat; this increases the effective surface of the valve head, a surface that becomes then greater than the effective surface of the piston 28, which destroys the pressure equilibrium. When this unbalance is greater than the action of the spring 43, the valve head 20 opens and allows the gas to pass from the pipe 24 where it possesses an over pressure.

The rod 44 may be replaced by a flexible member, fixed or articulated, for example at the position of the spindle 46 or the ring 50. This member may be an elastic band, a wire, a thin cable, a chain, etc.

The articulation between the rods 44 and 48 may be a gimbal joint or similar (not specifically shown), such that the diaphragm may act in any direction at all on the rod 40.

FIGURE 3 represents a portion of the pressure-reducing valve in which a stirrup 68, 70 joints the "movable member" mechanically to a component 52 which is a continuation of the valve seat 22; the ends 54, 56 of the stirrup fit into blind holes sunk into the outer wall of the component 52 and enable it to turn about an axis passing through these extremities. The stirrup is here integral with the lever 58 that has the function of the rod 40; the diaphragm of the reducing valve acts on the end of this lever in a direction perpendicular to the plane of the FIGURE 3; the angular displacement of the lever 58 is transmitted to the piston 60 and, by the latter, to the valve support 26. In the present example the piston head 62 comprises a groove 64 which allows the components 58, 68, 70 to transmit its tilting movement. Advantage has been taken of the fact that the piston head 62 extends beyond the piston proper to locate at the outer part of the valve support the spring 66 that tends to separate the valve support from the piston.

The functioning of this pressure-reducing valve is the same as that of the one in FIGURE 2. If the lever 58, displaced by the diaphragm under the influence of an underpressure in the exjansion chamber, is pushed towards the under side of the drawing plane of FIGURE 3, it turns about the axis 54, 56; it then transmits to the piston and the valve support a movement about the point where the valve head contacts the valve seat which is at the most behind the plane of FIGURE 3. The effort required by the diaphragm is small, even if the diameter of the valve head is large, since the spring 66 is relatively weak; this spring does not have to resist the pressure in the tube 24, this being done by the piston 60 and cylinder 26 system to which the upstream pressure is transmitted by an orifice 36 in the valve head 20.

Here again the movable member 58, 60 may be connected mechanically to the component 52, or to the outside of the valve seat 22 by a non-rigid system: one could for example replace the arms 68, 70 of the stirrup by cables, such as a cable 72 in FIG. 4, or chains, such as a chain 74 in FIG. 5, etc., being rigidly attached to the elements 52 or 22, or articulated at these elements. In both the embodiments of FIGS. 4 and 5, members 72 or 74 allow an angular displacement of piston 28 without allowing it to move away from the valve seat 22.

Other modifications may be made to the described pressure reducing valves, without departing from the spirit and scope of the invention. The piston could be integral with the lever 40 or 58. In the piston and cylinder balance system, the cylinder could be the component attached to the one that touches the diaphragm. This system could also be replaced by an equivalent system comprising a diaphragm and a housing.

What I claim is:

1. A pressure reducing valve comprising a valve body having an inlet for connection to a source of high pressure fluid, an expansion chamber, a valve seat in said body between the inlet and said expansion chamber, a valve head, means for urging the valve head onto the valve seat and for tilting the valve head thereon to provide a flow of fluid from the inlet when connected to said high pressure source in proportion to the amount of tilt, said valve head and said tilting means being located in the chamber, said urging means comprising a flanged holder for the valve head, a cylinder secured to the flanged holder to form therewith a support, a piston cooperatively engaged in the cylinder and forming a movable member therewith, means connected between the movable member and valve body for limiting the movement of the movable member outwardly of the cylinder, the cross-sectional area of the cylinder being substantially equal to the inlet area at the valve seat, and an orifice in said valve head connecting the inlet with the expansion chamber defined by the cylinder and piston.

2. A device as defined in claim 1, wherein the limiting means comprises a rod secured to an end of the movable member and extending distally through the orifice, a fixed rod mounted in the inlet and extending distally into the orifice, and means pivotally securing the ends of the rods to each other.

3. A device as defined in claim 1, wherein said urging means comprises a spring in the cylinder bearing against an end of the movable member and an end of the cylinder, urging the piston out of the cylinder.

4. A device as defined in claim 1, wherein the expansion chamber includes a flexible diaphragm and said tilting means comprises a rod secured to the movable member and is in distal contact with the diaphragm.

5. A device as defined in claim 3, wherein the spring is wound around externally of the cylinder.

6. A device as defined in claim 5, wherein the expansion chamber includes a flexible diaphragm, said tilting means comprises a stirrup pivotally mounted on the valve body and secured to the movable member, and a rod integral with the stirrup and in contact with the diaphragm.

7. A device as defined in claim 1, wherein the limiting means comprises a flexible member.

8. A device as defined in claim 7, wherein the flexible member is a chain.

9. A device as defined in claim 7, wherein the flexible member is a cable.

10. A pressure reducing valve comprising a valve body having an inlet for connection to a source of high pressure fluid, an expansion chamber, a valve seat in said body between the inlet and said expansion chamber, a valve head, means for urging the valve head onto the valve seat and for tilting the valve head thereon to provide a flow of fluid from the inlet when connected to said high pressure source in proportion to the amount of tilt, said valve head and said tilting means being located in the chamber, said urging means comprising a flanged holder for the valve head and a tiltable member enclosing a cavity and secured to the flanged holder to form a support therewith, means connected between the tiltable member and valve body for limiting the movement of the tiltable member away from the valve seat, the cross-sectional area of said tiltable member being substantially equal to the inlet area at the valve seat, and an orifice in said valve head connecting the inlet with the cavity enclosed within the tiltable member.

11. The invention of claim 10 wherein said tiltable member is a piston and movable cylinder system.

12. A demand pressure regulator, more especially for a breathing device, comprising in combination a valve seat, a tilting valve head on the downstream side of said valve seat, a diaphragm, a cylinder-and-piston assembly of which one of said cylinder and piston is secured to the side of the valve head opposite the valve seat in gastight relationship and the other of said cylinder and piston is mechanically connected to the diaphragm for tilting movement of the cylinder-and-piston assembly and the valve head relative to the valve seat upon movement of the diaphragm, the space surrounded by the valve seat communicating with the interior of the cylinder through the valve head, said other of said cylinder and piston having an effective area which is substantially equal to the area which is bounded by the contact line of the valve head with said valve seat, and means mechanically connecting said other of said cylinder and piston with the valve seat to permit the cylinder-and-piston assembly and valve head to tilt relative to the valve seat but to prevent the valve head from separating from the valve seat when the valve head is not tilted.

References Cited

UNITED STATES PATENTS

| | | |
|---|---|---|
| 1,125,596 | 1/1915 | Robertshaw. |
| 1,681,966 | 8/1928 | Zeidler. |
| 2,247,357 | 7/1941 | Brus. |
| 2,957,705 | 10/1960 | Herbenar. |

FOREIGN PATENTS

| | | |
|---|---|---|
| 1,131,998 | 6/1962 | Germany. |

WILLIAM F. O'DEA, Primary Examiner

R. GERARD, Assistant Examiner

U.S. Cl. X.R.

251—281, 303